(12) United States Patent
Lee

(10) Patent No.: US 6,244,124 B1
(45) Date of Patent: Jun. 12, 2001

(54) SCANNER GEAR ASSEMBLY WITH VARIABLE SPEED RATIO

(75) Inventor: Kun Chin Lee, Chia I (TW)

(73) Assignee: Teco Image Systems Co., Ltd., Taipei (TW)

(*) Notice: Subject to any disclaimer, the term of this patent is extended or adjusted under 35 U.S.C. 154(b) by 0 days.

(21) Appl. No.: 09/391,501

(22) Filed: Sep. 8, 1999

(51) Int. Cl.[7] ............................... F16H 3/34; H04N 1/04
(52) U.S. Cl. .................... 74/354; 74/89.22; 358/412; 358/497
(58) Field of Search .................. 74/89.2, 89.21, 74/89.22, 353, 354; 358/412, 497

(56) References Cited

U.S. PATENT DOCUMENTS

| | | | |
|---|---|---|---|
| 138,456 | * 4/1873 | Walty | 74/354 X |
| 1,481,706 | * 1/1924 | Goodwin | 74/354 X |
| 3,938,437 | * 2/1976 | Punater | 74/354 X |
| 5,373,372 | * 12/1994 | Loewen | 358/486 |

* cited by examiner

Primary Examiner—Allan D. Herrmann
(74) Attorney, Agent, or Firm—Rosenberg, Klein & Lee

(57) ABSTRACT

A gear assembly with variable speed ratio for a scanner comprises a base fixed on the bottom of the scanner, a first motor and a second motor arranged on the base, a rotary disk, a first gear set and a second gear set. The first motor and the second motor are connected to a power output gear and a driving gear, respectively. The rotary disk is arranged on the base, and has a toothed portion engaged with the driving gear. The first gear set and the second gear set each have a different speed ratio, and are arranged on the rotary disk. The second motor drives the rotary disk to selectively engage the first gear set or the second gear set with the power output gear to select the desired speed ratio.

9 Claims, 7 Drawing Sheets

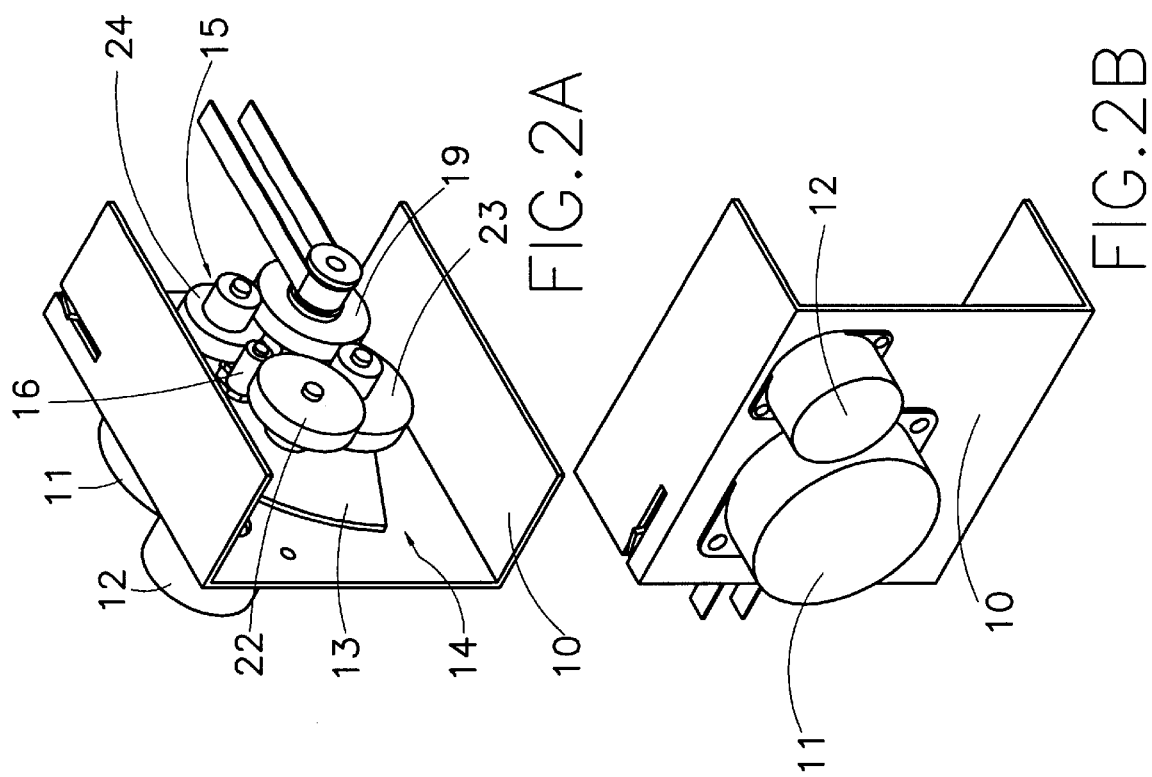
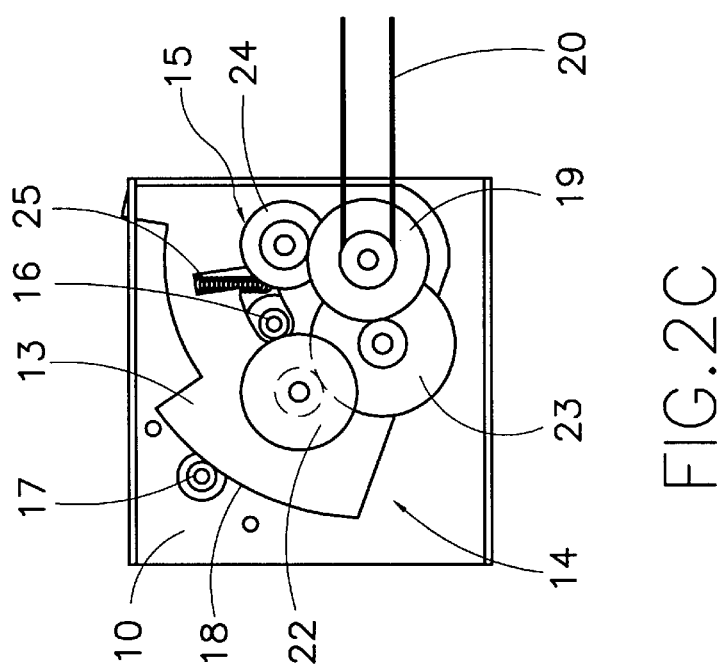

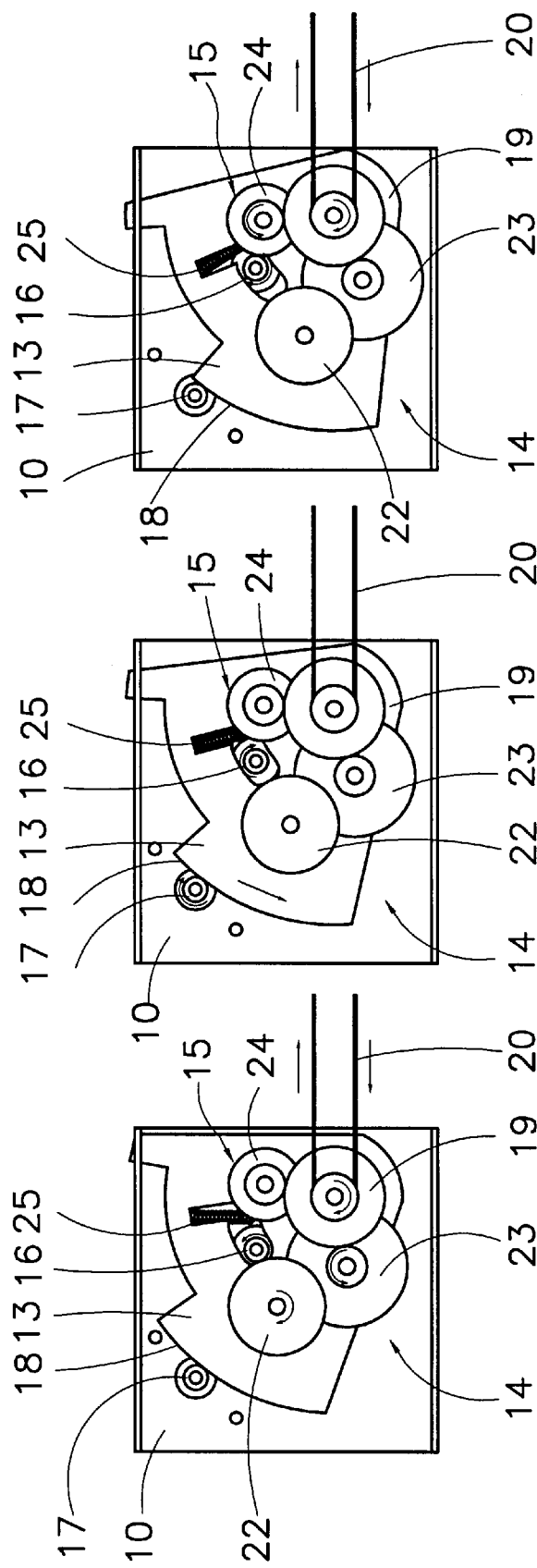

SCANNER GEAR ASSEMBLY WITH VARIABLE SPEED RATIO

FIELD OF THE INVENTION

The present invention relates to a gear assembly for a scanner, particularly to a gear assembly for a scanner which can select different speed ratios such that the scanner is able to perform the scanning task at different resolutions.

BACKGROUND OF THE INVENTION

As shown in FIG. 1, the conventional scanner 1a generally uses a motor (not shown) as a power source, and a change gear set 10a and a flexible member 11a, such as a belt or a steel rope, to displace a charge coupled device (CCD) 12a such that the CCD 12a is moved along the scanning direction.

However, the change gear of the conventional scanner can only provide a constant speed ratio to the scanner when being driven by the motor. Therefore, the resolution of the scanner cannot be adjusted.

It is the object of the invention provide a gear assembly with variable speed ratios for a scanner wherein two gear sets with different speed ratios are arranged on a rotary disk and the rotary disk is driven to select the desired speed ratio, such that the scanner is able to perform the scanning task at different resolutions.

The various objects and advantages of the present invention will be more readily understood from the following detailed description when read in conjunction with the appended drawings, in which:

BRIEF DESCRIPTION OF DRAWINGS

FIG. 2A is the perspective view of present invention;

FIG. 2B is the perspective view of present invention from another view angle;

FIG. 2C is the plane view of present invention;

FIGS. 3A, 3B and 3C are views showing the gear assembly of the present invention in different speed ratios;

BRIEF DESCRIPTION OF PREFERRED EMBODIMENT

Figure 1:
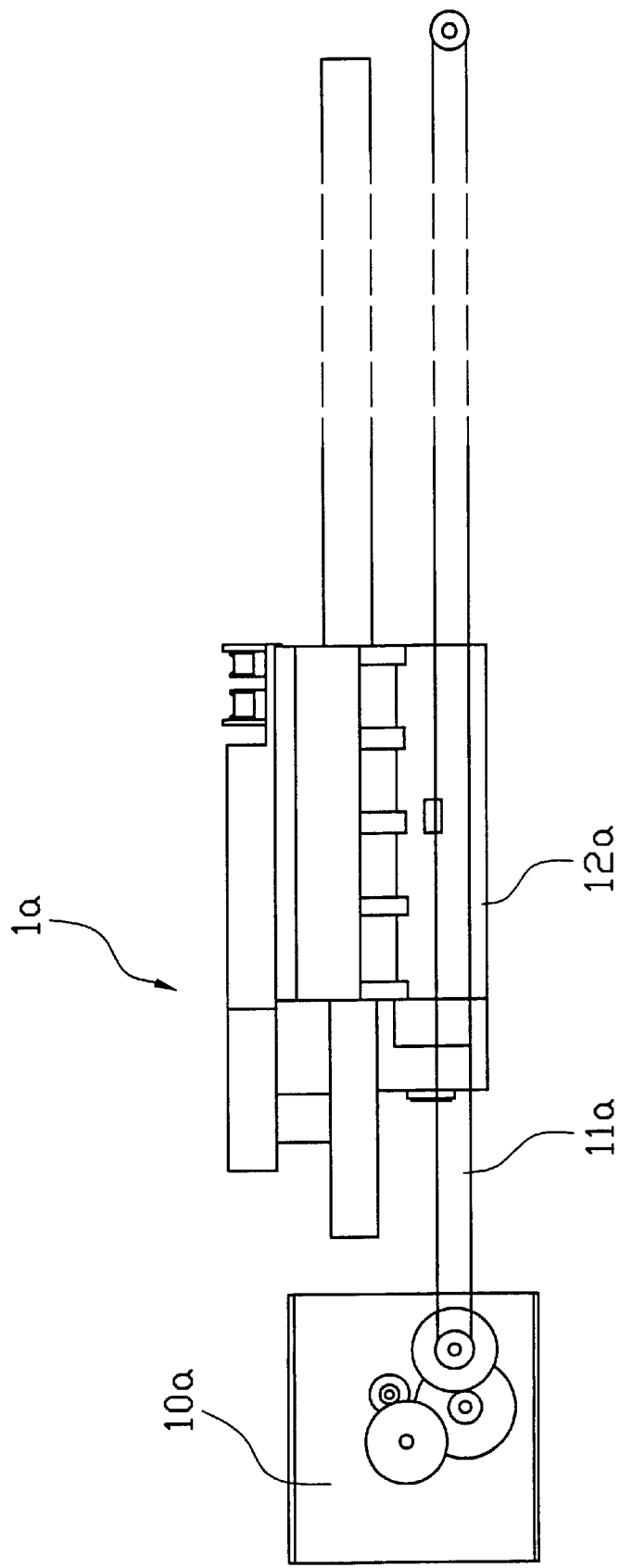
FIG. 1 is the schematic view of a conventional scanner.
Figure 4:
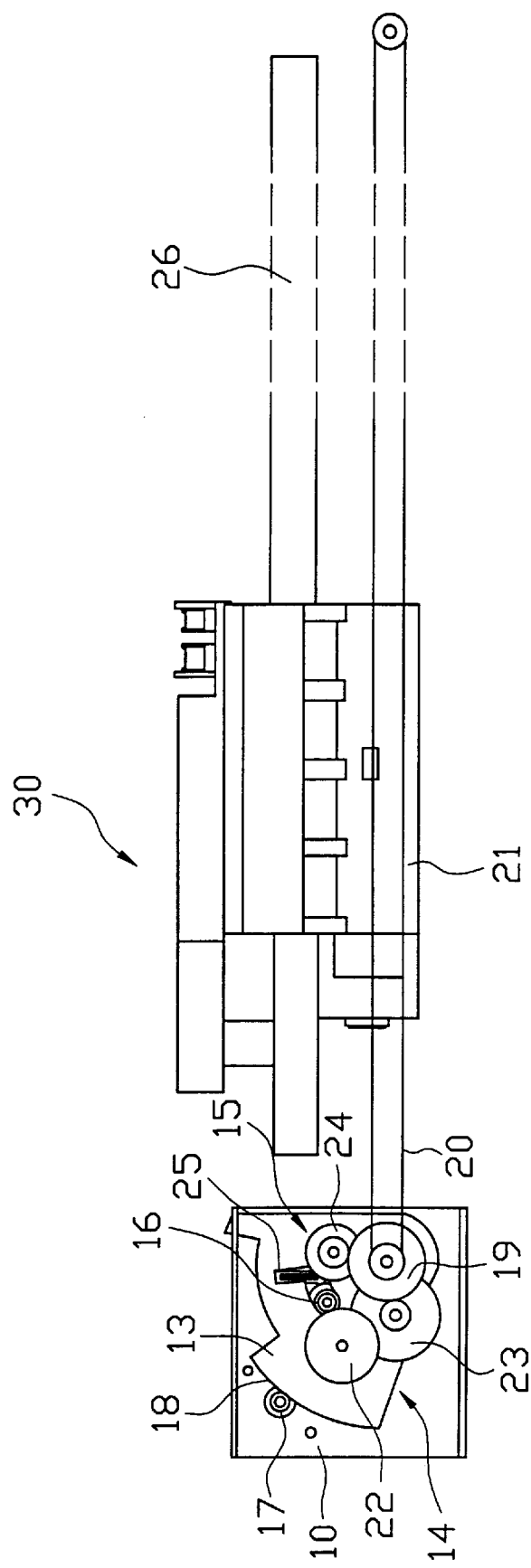
FIG. 4 is the plane view of the first embodiment of the present invention.

With reference now to FIGS. 2A, 2B and 2C, the present invention provides a gear assembly with variable speed ratios for a scanner 30 (shown in FIG. 4). The gear assembly according to the present invention comprises at least a base 10, a first motor 11, a second motor 12, a rotary disk 13, a first gear set 14 and a second gear set 15. The base 10 is fixed at a predetermined position within the scanner. The first motor 11 and the second motor 12 are arranged on predetermined locations on the base 10. The first motor 11 is a primary power output source and has a power output gear 16 arranged on the axis thereof. The second motor 12 is used to drive the rotary disk 13 and has a driving gear 17 on the axis thereof. The rotary disk 13 is rotatably arranged on the base 10, and has tooth portion 18 engaged with the driving gear 17. The rotary disk 13 is driven by the second motor 12 such that the power of the first motor 11 can be selectively transmitted to the first gear set 14 or the second gear set 15, through the power output gear 16. Afterward, the power of the first motor 11 is transmitted to a flexible member 20 through a transmitting gear 19. The flexible member 20 (such as belt or steel rope) accordingly drives an optical module in the form of the CCD 21 such that the CCD 21 is moved along a scanning direction guided by a guiding rod 26 for the scanner 30, 32, 34, 36 as shown in FIGS. 4 to 7.

The first gear set 14 comprises at least a first gear 22 and a second gear 23, which are pivotally arranged on the rotary disk 13. The first gear 22 and the second gear 23 are each a stacked type gear with a smaller gear stacked on a larger gear. The smaller gear portion of the first gear 22 is engaged with the larger gear portion of the second gear 23. The smaller gear portion of the second gear 23 is engaged with the transmitting gear 19 to achieve a deceleration function. The second gear set 15 comprises at lest a third gear 24, which is also a stacked type gear with a smaller gear stacked on a larger gear, wherein the smaller gear portion of the third gear 24 is engaged with the transmitting gear 19 to achieve a deceleration function. Moreover, a spring 25 is arranged between the base 10 and the rotary disk 13 with both ends thereof respectively fixed on the base 10 and the rotary disk 13. The spring 25 functions to stabilize the relative positions of those gears at different transmission speeds.

As shown in FIGS. 3A, 3B and 3C, the present invention provides a gear assembly for different speed ratios. More particularly, the second motor 12 drives the rotary disk 13 with gear set 14 and 15, of different speed ratios, to select the desired speed ratio. As shown in FIG. 3A, when the second motor 12 drives the rotary disk 13 to rotate in clockwise direction by a certain number of teeth, the first gear 22 of the first gear set 14 on the rotary disk 13 is engaged with the power output gear 16. Therefore, the power of the first motor 11 is transmitted, through the power output gear 16, the first gear 22 and a second gear 23 of the first gear 14, to the transmitting gear 19. Driven by this driving force, the CCD 21 is moved along a scanning direction for a scanning operation. As shown in FIGS. 3B and 3C, when the second motor 12 drives the rotary disk 13 to rotate in counter clockwise direction by a certain number of teeth, the third gear 24 of the second gear set 15 on the rotary disk 13 is engaged with the power output gear 16. Therefore, the power of the first motor 11 is transmitted, through the power output gear 16, the third gear 24 of the second gear set 15, to the transmitting gear 19, thus linking the flexible member 20 and the CCD module 21. Driven by this driving force, the CCD 21 is moved along the scanning direction for a scanning operation. The present invention is characterized in that the gear set 14 and 15 of different speed ratios are arranged on the rotary disk 13 whereby the rotary disk 13 is driven to select the desired speed ratio for the scanning task at different resolutions.

Figure 5:
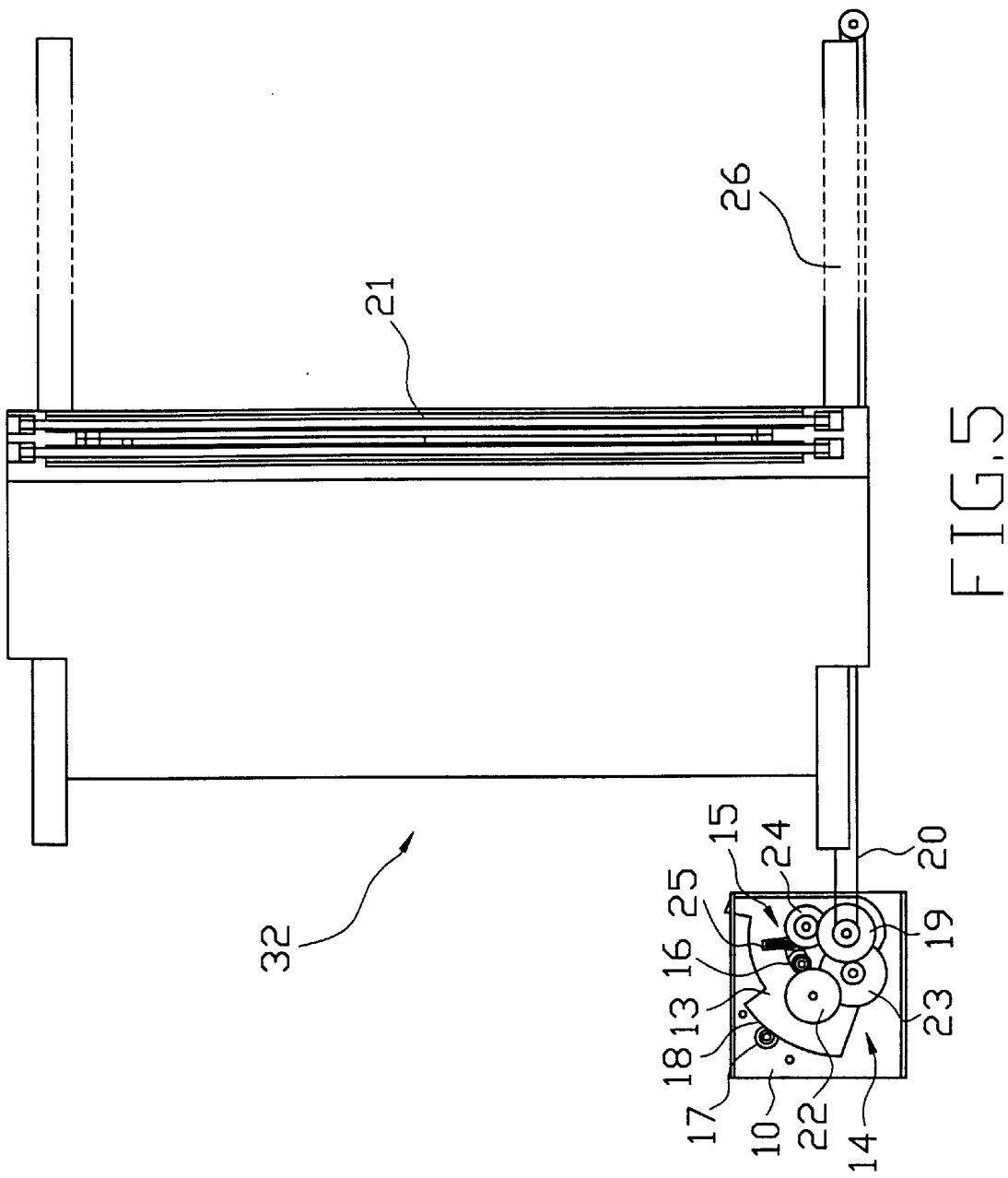
FIG. 5 is the plane view of the second embodiment of the present invention.
Figure 6:
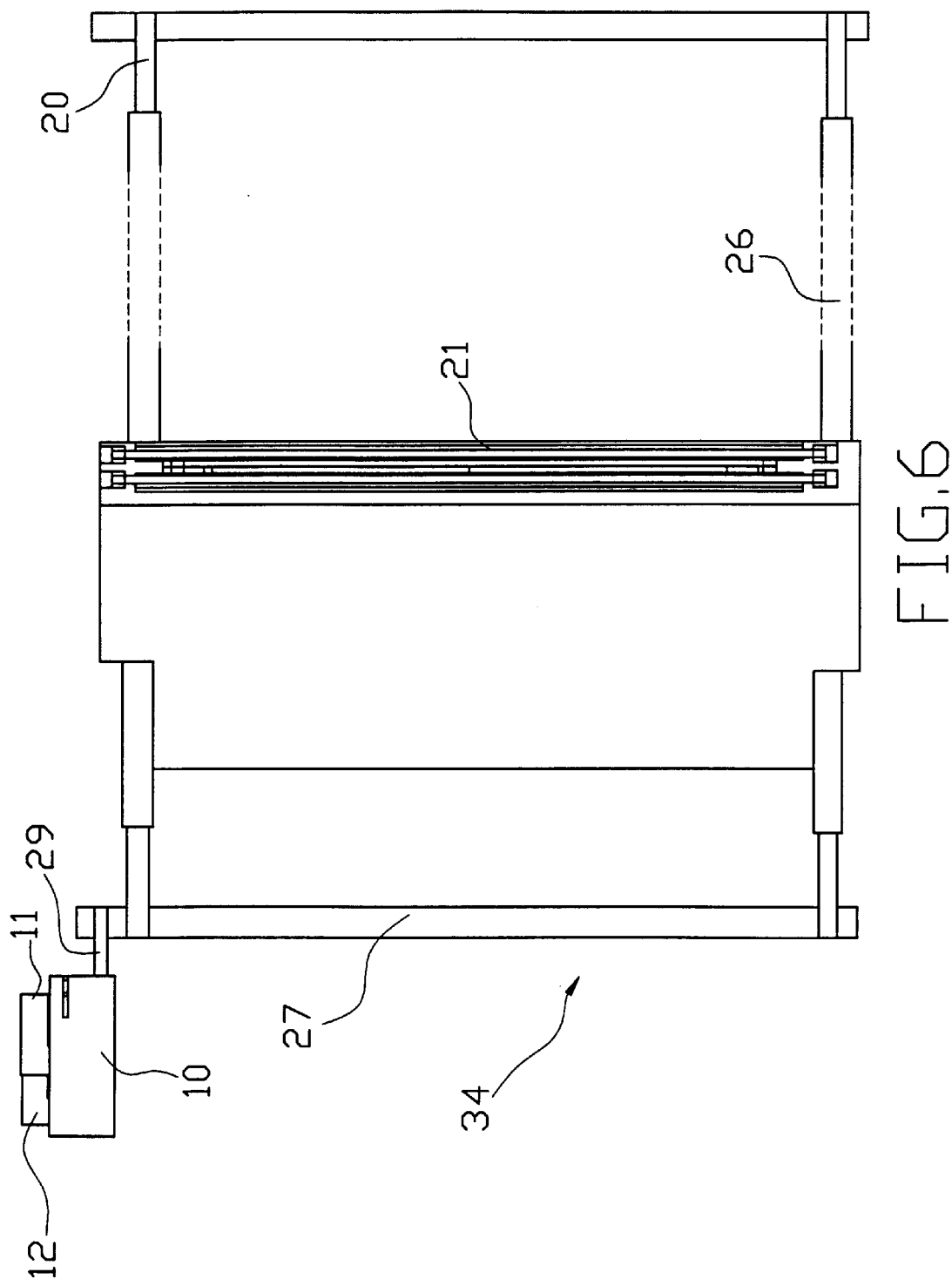
FIG. 6 is the plane view of the third embodiment of the present invention.
Figure 7:
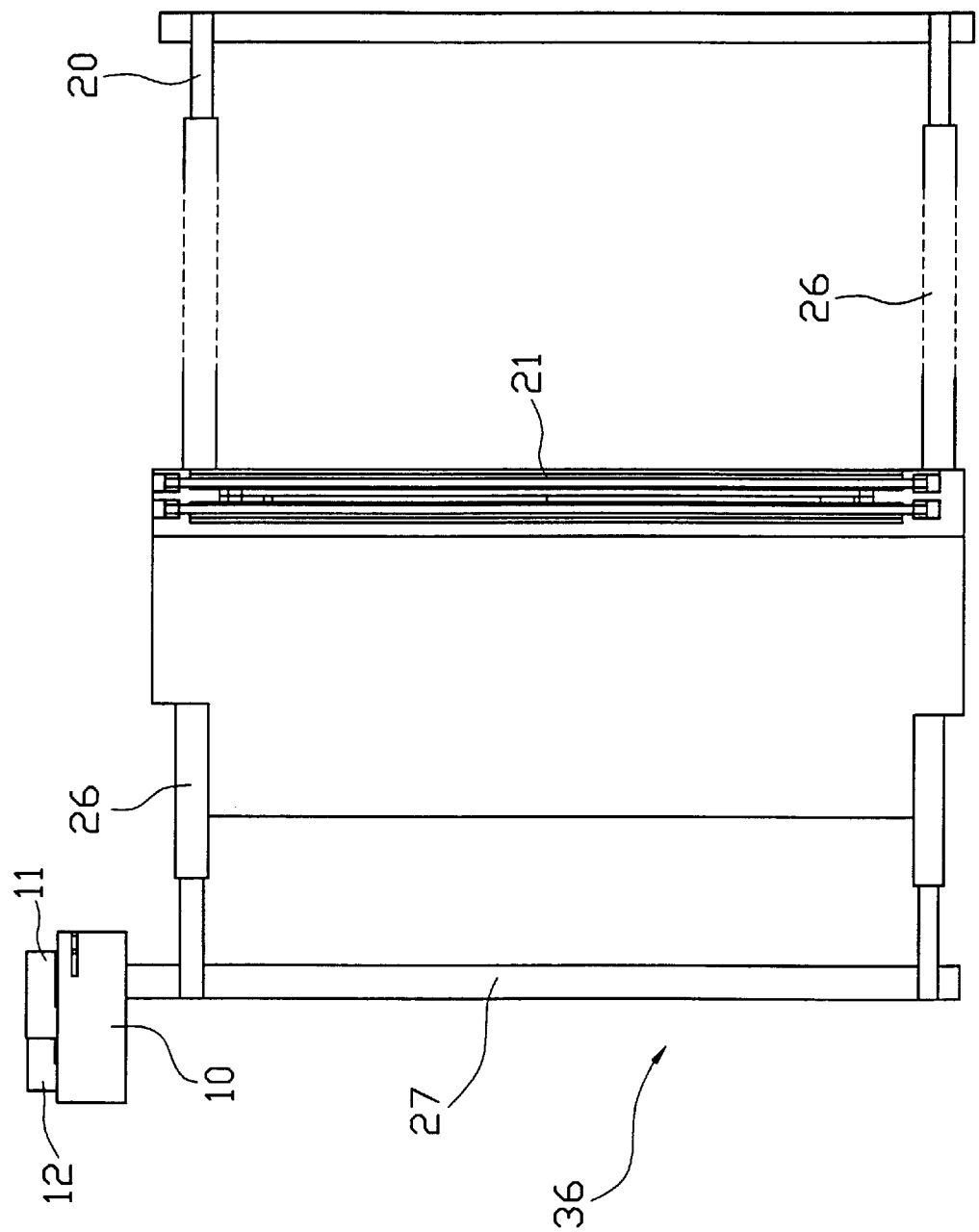
FIG. 7 is the plane view of the fourth embodiment of the present invention.

In this invention, the plane of the rotary disk 13 can be vertical to the scanning plane of scanner 30 as shown in FIG. 4 or parallel to the scanning plane of scanner 32 as shown in FIG. 5. Moreover, the gear assembly with variable speed ratio of scanner 34, 36 drives a rotating shaft 27, as shown in FIGS. 6 and 7. The gear assembly with variable speed ratio of scanner 34 drives rotating shaft 27 through a belt 29 and links to flexible member 20 (such as belt or steel rope) to drive the CCD module 21.

To sum up, the gear assembly with variable speed ratio for a scanner has two gear sets with different speed ratios arranged on a rotary disk and the rotary disk is driven to select the desired speed ratio such that the scanner performs scanning task at different resolutions.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A gear assembly with variable speed ratio for a scanner comprising:

a base fixed on a bottom of the scanner;

a first motor and a second motor arranged on said base, said first and said second motor being respectively connected to a power output gear and a driving gear;

a rotary disk arranged on said base, said rotary disk having a toothed portion engaged with said driving gear;

a first gear set and a second gear set each having different speed ratio, and being arranged on said rotary disk;

said second motor driving said rotary disk to selectively engage one of said first gear set and said second gear set with said power output gear to select a desired speed ratio.

2. The gear assembly with variable speed ratio for a scanner as in claim 1, wherein said first gear set comprises at least a first gear and a second gear pivotally arranged on said rotary disk, said first gear and said second gear each being a stacked type gear with a smaller gear stacked on a larger gear, said smaller gear portion of said first gear being engaged with said larger gear portion of said second gear, said smaller gear portion of said second gear being engaged with a transmitting gear to drive an optical module of the scanner.

3. The gear assembly with variable speed ratio for a scanner as in claim 1, wherein said second gear set comprises at least a third gear, said third gear being a stacked type gear with a smaller gear stacked on a larger gear, said smaller gear portion of said third gear being engaged with a transmitting gear to drive an optical module of the scanner.

4. The gear assembly with variable speed ratio for a scanner as in claim 1, further comprising a spring connected between said base and said rotary disk.

5. The gear assembly with variable speed ratio for a scanner as in claim 1, wherein said rotary disk is disposed in a vertical plane with respect to a scanning plane of the scanner.

6. The gear assembly with variable speed ratio for a scanner as in claim 1, further comprising a transmitting gear for driving an optical module of the scanner through a belt linked to a rotating shaft, said rotating shaft having a flexible member to drive the optical module.

7. The gear assembly with variable speed ratio for a scanner as in claim 1, further comprising a transmitting gear for driving an optical module of the scanner through a rotating shaft, said rotating shaft having a flexible member to drive the optical module.

8. A gear assembly with variable speed ratio for a scanner comprising:

a base fixed on a bottom of the scanner;

a motor arranged on said base, said motor being connected to a power output gear;

a rotary disk arranged on said base, said rotary disk being driven by said driving gear;

a first gear set and a second gear set each having different speed ratio, and being arranged on said rotary disk;

said rotary disk being driven by said power output gear to selectively engage one of said first gear set and said second gear set with said power output gear to select a desired speed ratio.

9. The gear assembly with variable speed ratio for a scanner as in claim 1, wherein said rotary disk is disposed in a plane that is parallel to a scanning plane of the scanner.

* * * * *